(12) United States Patent
Stern et al.

(10) Patent No.: US 8,077,041 B2
(45) Date of Patent: Dec. 13, 2011

(54) REAL-TIME AUTOMATIC RFID INVENTORY CONTROL SYSTEM

(75) Inventors: Miklos Stern, Woodmere, NY (US); Benjamin J. Bekritsky, Hollis, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 351 days.

(21) Appl. No.: 12/342,499

(22) Filed: Dec. 23, 2008

(65) Prior Publication Data

US 2010/0156597 A1    Jun. 24, 2010

(51) Int. Cl.
G08B 13/14    (2006.01)
(52) U.S. Cl. ............... 340/572.1; 340/568.6; 340/10.1; 340/825.49
(58) Field of Classification Search .... 340/572.1–572.9, 340/568.1, 568.6, 10.3, 10.32, 825.49, 5.1, 340/5.73, 10.1
See application file for complete search history.

(56) References Cited

U.S. PATENT DOCUMENTS

| | | | |
|---|---|---|---|
| 5,920,261 A | 7/1999 | Hughes | |
| 7,035,818 B1 | 4/2006 | Bandy et al. | |
| 7,212,125 B2 * | 5/2007 | Shanks et al. | 340/572.7 |
| 7,757,947 B2 * | 7/2010 | Reznik et al. | 235/384 |
| 7,844,505 B1 | 11/2010 | Arneson | |
| 2007/0063817 A1 | 3/2007 | Cherry | |
| 2007/0215700 A1 | 9/2007 | Reznik | |
| 2008/0068174 A1 * | 3/2008 | Al-Mahdawi | 340/572.7 |
| 2008/0079564 A1 * | 4/2008 | Shafer et al. | 340/539.1 |

FOREIGN PATENT DOCUMENTS

WO    WO0106401 A1    1/2001

OTHER PUBLICATIONS

PCT International Search Report Dated Mar. 31, 2010.

* cited by examiner

*Primary Examiner* — Daniel Previl
(74) *Attorney, Agent, or Firm* — Nick Fan; Terri S. Hughes

(57) ABSTRACT

The present disclosure describes a system for tracking store-items placed in a storage space. The system includes a plurality of wireless RFID readers distributed within the storage space such that at least one store-item, having an RFID tag attached, is within an interrogation range of at least one of the wireless RFID reader. The system further includes a monitoring server operative to communicate wirelessly with the a plurality of wireless RFID readers to obtain information collected by the plurality of wireless RFID readers from the RFID tag attached to the at least one store-item.

22 Claims, 3 Drawing Sheets

REAL-TIME AUTOMATIC RFID INVENTORY CONTROL SYSTEM

FIELD OF THE DISCLOSURE

The present disclosure, in general, relates to the field of radio frequency identification (RFID) technology, and in particular, relates to a real-time automatic RFID inventory control system.

BACKGROUND

In recent times, wireless technology has paved the way for several new and useful applications in the field of electronics and communication. One of the important applications of wireless technology is radio-frequency identification technology, popularly known as RFID. RFID is a process of identifying items remotely based on electromagnetic or electrostatic coupling in the RF portion of the electromagnetic spectrum. RFID systems are employed for various purposes such as object or cattle tracking, security, inventory control in retail stores, and the like.

In particular, the retail stores have to cope with the difficulty of keeping a track of their inventory. In a large store, customers often misplace items on wrong shelves while looking for their desired items. It is cumbersome for sales staff in the store to manually locate and arrange the items properly. This leads to loss in sales, incorrect inventory details, and ultimately to loss of profitability for a retailer. One of the commonly used methods to track items in a retail store is barcode scanning. In barcode scanning method, each item in the store is marked with a barcode. To identify an item, the sales staff scans the item and reads the marked barcode using a barcode reader, and accordingly puts the item on a correct shelf. Such a method is time consuming and is susceptible to human errors.

To overcome drawbacks of the barcode method, some stores have begun using the RFID technology to accomplish the task of tracking items in the store. In this, every item has an RFID tag attached to it, the sales staff does not need to manually scan every item to check inventory, but rather check items on a shelf using an RFID reader. This generally saves times, but still involves human intervention.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The present disclosure is directed towards a real-time automatic RFID inventory control system for tracking store-items placed in a storage space. In one embodiment, the system includes a plurality of RFID readers distributed within the storage space. The RFID readers are distributed such that at least one store-item, having an RFID tag attached, is within an interrogation range of at least one of the RFID reader. The system also includes a monitoring server operative to communicate wirelessly with a plurality of RFID readers to obtain information collected by the plurality of RFID readers from the RFID tags attached to the store-items. The monitoring server maintains a database of inventory present in the storage space, and keeps the database updated using the information provided by the RFID readers.

Figure 1:
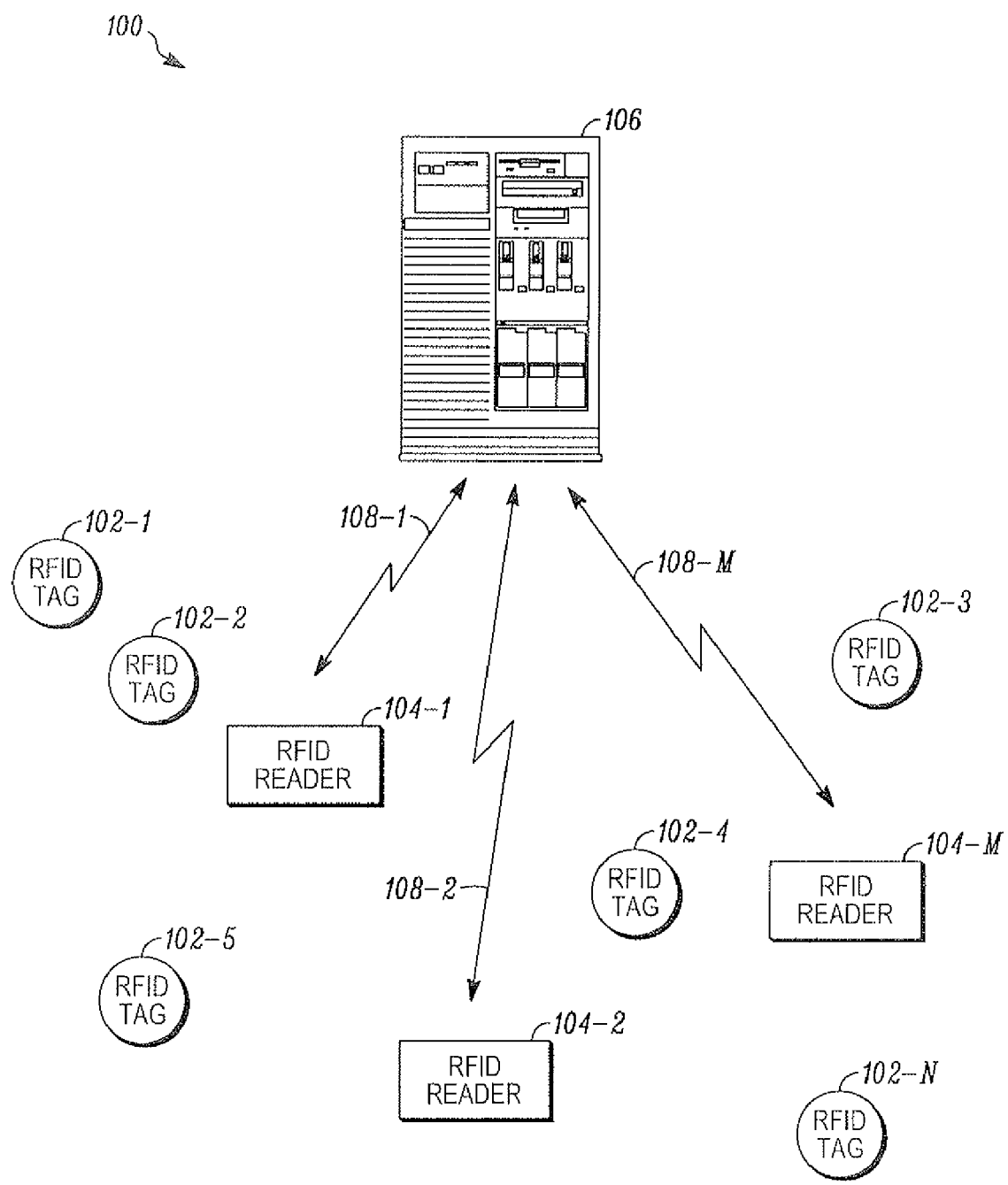
FIG. 1 illustrates a system for real-time automatic RFID inventory control in a store in accordance with some embodiments of the present disclosure.

FIG. 1 illustrates a system 100 for real-time automatic inventory control in a storage space. In one embodiment, the system 100 can be employed in a retail store having a large inventory. The system 100 includes various RFID transponders or tags 102-1 to 102-N, collectively referred to as tags 102, attached to store-items present in the store. The RFID tags 102 can be taken from either same or different manufacturers. Each of the tags 102 includes an integrated circuit for storing and processing information, modulating and demodulating an RF signal, and other functions. Each of the tags 102 also includes an antenna for receiving and transmitting the RF signal. The system 100 further includes RFID readers 104-1 to 104-M, collectively referred to as readers 104. The readers 104 are distributed throughout the store such that they can scan and interrogate the tags 102. The system 100 also includes a monitoring server 106. The readers 104 communicate with the monitoring server 106 wirelessly, as shown by wireless communication links 108-1 to 108-M. The system 100 can also include one or more RFID beacon tags (not shown in the figure).

The tags 102 attached to the store-items include information pertaining to the respective store-item such as item type, price, size, quality, and the like. It is possible to track the store-items by directing the readers 104 to scan the tags 102. The readers 104 scan and interrogate the tags 102, and collect information included in the tags 102. The readers 104 provide the collected information to the monitoring server 106. The monitoring server 106 maintains a database including the information about the store-items. The RFID system 100 works in real-time, and thus always keeps the database updated.

The RFID beacon tags are regular RFID tags with known location information. If one or more readers 104 can read certain tags, the reader's location can be determined from this information. They can also provide information on coverage of the readers 104. For example, if a reader cannot scan a beacon tag placed at a particular location, then more readers are placed in that location to provide adequate coverage.

The system 100 also provides information about the location of the store-items tagged with the RFID tags 102. The system 100 can obtain location information in various different ways. As each reader 104 has RF coverage over a limited area, so by knowing the location of a reader, the system 100 can determine the area within which the tags polled by the reader are located. In one embodiment, the location information of the readers 104 can be fed into a database during their installation. In an alternate embodiment, the readers 104 can be "self-locating" by knowing which beacon tags they can read. Once the location of the readers 104 are known, the system 100 can determine the location of the items with the RFID tags attached to them. For example, if a particular reader reads a tag, then the tag must be within the coverage area of that reader. Furthermore, if the system knows that within the coverage area of that particular reader there is only one clothing rack, than the items read by the reader are likely on that rack. If more than one reader reads a tag, then the system 100 determines the location of the tag to be within the intersection of the coverage areas of the readers.

It is to be noted that the system 100 is fully flexible and easily reconfigurable since the tags 102, the readers 104, and the monitoring server 106 communicate with each other completely wirelessly.

Figure 2:
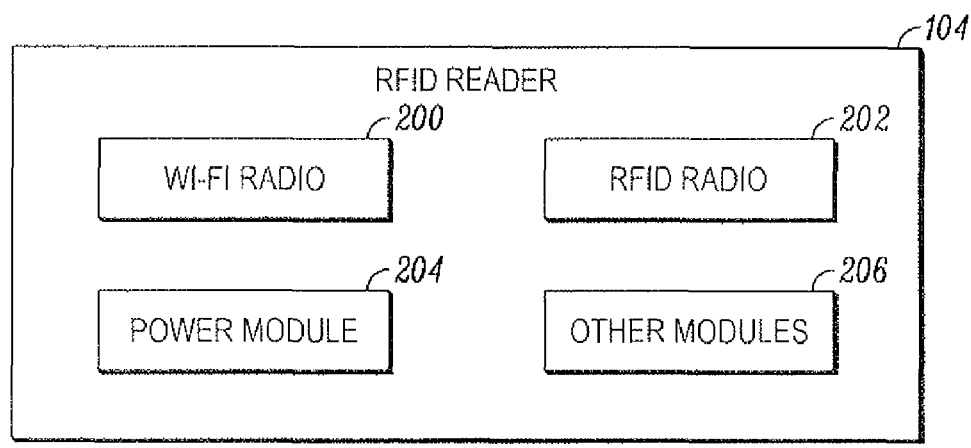
FIG. 2 illustrates a block diagram for an RFID reader included in the system of FIG. 1 in accordance with some embodiments of the present disclosure.

FIG. 2 illustrates a block diagram for the RFID reader 104 included in the system 100. The functionality of the reader 104 is explained with respect to various modules depicted in the block diagram. It is to be understood that the various modules are shown to facilitate better understanding of the reader 104. However, the modules included in the RFID reader 104 are not meant to be a limitation on an embodiment of the present disclosure. The reader 104 may be a fixed device or a handheld portable device. In case the readers 104 are fixed devices, they can be fixed at various places in the store via double-sided tape, Velcro, hangers, and the like. The following description of the reader 104 has been explained with reference to components shown in FIG. 1.

In one embodiment, the reader 104 includes a wireless radio such as Wi-Fi radio 200, an RFID radio 202, a power module 204, and other modules 206 that may assist in proper functioning of the RFID reader 104.

The Wi-Fi radio 200 enables the RFID reader 104 to communicate with the monitoring server 106. The Wi-Fi radio 200 includes a transmitter and a receiver with conventional circuitry to enable digital or analog transmissions over a wireless communication channel. The Wi-Fi radio 200 is designed to operate over air interface such as 802.11 WLAN (Wireless Local Area Network), 802.16 WiMax (Worldwide Interoperability for Microwave Access), and the like.

The RFID radio 202 enables the RFID reader 104 to identify and interrogate the tags 102. The RFID radio 202 includes one or more antennas for transmitting and receiving RF signals. In one embodiment, the antenna can be a dual-polarized antenna, a circularly polarized antenna, or an Omni-directional antenna. The reader 104 can have multiple antennas to create different radiation patterns and polarizations by switching between the antennas. In an embodiment, the antennas can have at least two orthogonal polarizations for each antenna pattern.

In one embodiment, the Wi-Fi radio 200 for the monitoring server 106, and the RFID radio 202 for the tags 102 can share a common processor or control circuitry. This is possible, since the system 100 can be operated in a way that the RFID and the Wi-Fi radios are not operating simultaneously. This not only saves chip area, but also reduces implementation cost of the reader 104.

As mentioned above, the Wi-Fi radio 200 manages communication of the reader 104 with the monitoring server 106. Whenever an inventory check or poll is required in the store, the Wi-Fi radio 200 receives instructions from the monitoring servo 106 to obtain information pertaining to the store-items placed in a storage space of the store. On receiving the instructions, the RFID radio 202 scans the tags 102 attached to the store-items that are present within the coverage range of the reader 104. In one embodiment, the tags 102 can also serve as beacon tags that are locatable by the reader 104. Thus, each of the store-item can be easily located with the help of beacon tags, thereby enabling a retailer to build an inventory map for the store. The reader 104 interrogates each and every tag within its coverage range, and obtains information pertaining to the store-items.

After obtaining the information, the RFID radio 202 communicates with the Wi-Fi radio 200 to transmit the obtained information to the monitoring server 106. The Wi-Fi radio 200 modulates the information and transmits it to the monitoring server 106.

The power module 204 provides operating power to the reader 104. In one embodiment, the power module 204 includes a battery that supplies power to the reader 104. The battery can be trickle charged from ambient lighting in the store. Since the store generally has ample lighting sources, the battery can be charged easily. In one embodiment, the reader 104 is operative at low duty cycle and usually in OFF mode, and only turns ON for a short period of time, this extends battery life and the battery lasts for several months without servicing. In another embodiment, larger batteries can be employed for readers that are placed at hidden places such as under the tables where very low ambient light is available. In an alternate embodiment, the reader 104 can be AC-powered, obtaining power from AC main supply.

The reader 104, specifically RFID radio 202 included in the reader 104, supplies operating power to the tags 102, considering that the tags 102 are passive tags. Passive tags do not have a battery of their own, and therefore derive power from the readers. The tags 102 draw power from the electro-magnetic field of the readers 104.

Figure 3:
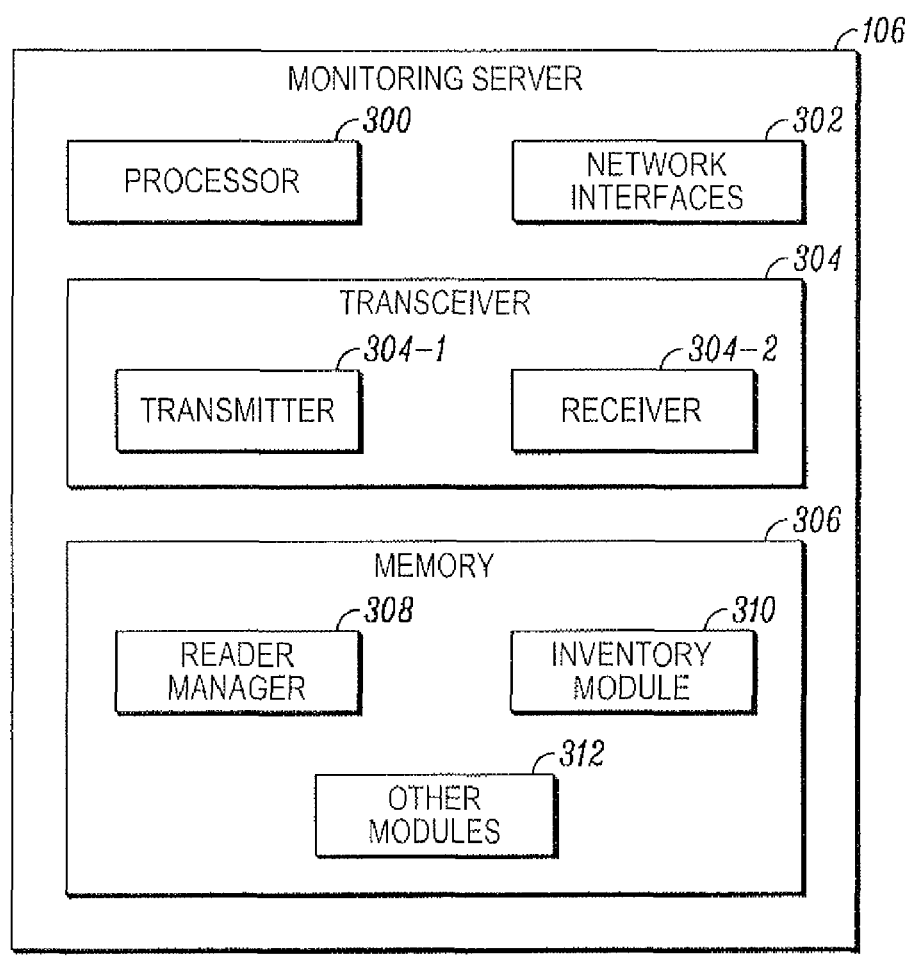
FIG. 3 illustrates a block diagram for a monitoring server included in the system of FIG. 1 in accordance with some embodiments of the present disclosure.

FIG. 3 illustrates a block diagram for the monitoring server 106. The functionality of the monitoring server 106 is explained with respect to various modules depicted in the block diagram. It is to be understood that the various modules are shown to facilitate better understanding of the monitoring server 106. However, the modules included in the monitoring server 106 are not meant to be a limitation on an embodiment of the present disclosure. The following description of the monitoring server 106 has been explained with reference to components shown in FIG. 1.

In one embodiment, the monitoring server 106 includes a processor 300, one or more network interfaces 302 for establishing connection with the readers 104 and other devices present in the system 100, a transceiver 304, and a memory 306 for storing operating instructions that are executed by the processor 300. Although not shown, the monitoring server 106 also can include an antenna, a duplexer, a circulator, or other highly isolative means for intermittently providing data from the transceiver 304 to the antenna and from the antenna to the transceiver 304. The monitoring server 106, for example, can be an integrated unit containing at least all the elements depicted in FIG. 1, as well as any other elements necessary for the monitoring server 106 to perform its particular functions. In one embodiment, the monitoring server 106 is a general-purpose computer storing programs or instructions for performing various tasks.

The processor 300 includes one or more microprocessors, microcontrollers, DSPs (Digital Signal Processors), state machines, logic circuitry, or any other device or devices that process information based on operational or programming instructions. Such operational or programming instructions are stored in the memory 306. The memory 306 can be an IC (Integrated Circuit) memory chip containing any form of RAM (Random Access Memory) or ROM (Read-Only Memory), a floppy disk, a CD-ROM (Compact Disk Read-Only Memory), a hard disk drive, a DVD (Digital Video Disc), a flash memory card or any other medium for storing digital information. One of ordinary skill in the art will recognize that when the processor 300 has one or more of its functions performed by a state machine or logic circuitry, the memory 306 containing the corresponding operational instructions can be embedded within the state machine or logic circuitry.

The transceiver 304 includes a transmitter 304-1 and a receiver 304-2. The transceiver 304 enables the monitoring server 106 to communicate with the readers. In this regard, the transmitter 304-1 and the receiver 304-2 include conventional circuitry to enable digital or analog transmissions over a wireless communication channel. The transceiver 304 is designed to operate over air interface such as 802.11 WLAN (Wireless Local Area Network), 802.16 WiMax (Worldwide Interoperability for Microwave Access), and the like.

The implementations of the transmitter 304-1 and the receiver 304-2 depend on the implementation of the monitoring server 106. For example, the transmitter 304-1 and the receiver 304-2 can be implemented as an appropriate wireless modem, or as conventional transmitting and receiving components of two-way wireless communication devices. Most, if not all, of the functions of the transceiver 304 can be implemented in a processor, such as the processor 300.

The memory 306 includes various modules containing instructions for functioning of the monitoring server 106. The functioning of the monitoring server 106 is explained using the modules to facilitate better understanding; however, these modules do not limit implementation various embodiments disclosed in the present disclosure.

In one embodiment, the memory 306 includes a reader manager 308, an inventory module 310, and other modules 312 such as operating system, application support software, and other similar modules that assist in proper functioning of the monitoring server 106.

The reader manager 308 manages communication of the monitoring server 106 with the readers 104, and assists the readers 104 in their functioning. In one embodiment, when an inventory poll is required in the store, the reader manager 308 communicates with the readers 104 and directs them to interrogate the tags 102. The reader manager 308 also specifies information that is required from the tags 102. The information can include location of the store-items, type of the store-items, price details of the store-items, and the like. The readers 104 interrogate the tags 102 to obtain the requisite information, and provide it to the monitoring server 106. Apart from directing the readers 104 for polling, the monitoring server 106 also keeps a check on power status of each of the readers 104. In one embodiment, the monitoring server 106 monitors battery power level of the readers 104 on a periodic basis, and sets alerts if any reader has a low battery level. The monitoring server 106 can also set alerts if a reader gets faulty, or if a reader intimates that one or more tags 102 are not operational. The monitoring server 106 raises either a visual alarm or an audio alarm indicating service requirement for affected reader(s). In an alternate embodiment, the readers 104 transmit their power status to the monitoring server 106 whenever they have low battery level.

In one embodiment, the readers 104 need not be in constant contact with the monitoring server 106 to receive instructions for conducting an inventory poll. Rather, the readers 104 can include a real-time clock, programmed by the monitoring server 106 to turn ON the readers 104 at pre-specified time intervals to take inventory at those time intervals. It is to be noted that turning the readers 104 ON only at certain intervals saves the battery power of the readers 104. Moreover, the monitoring server 106 can program the readers 104 to remain OFF at times when tire store is closed such as at night or on holidays.

The monitoring server 106 can instruct one or more readers 104 to interrogate the tags 102 for various reasons. For example, someone may wish to search for a specific store-item in the store. When the readers 104 turn ON and make contact with the monitoring server 106, there would be instructions waiting to tell them to interrogate the tags 102 to search for the specific store-item. Accordingly, the readers 104 scan the tags 102 to search for the specific store-item, and provide the result of the search the monitoring server 106. The monitoring server 106 determines the location of the store-item from the result, specifically by knowing which reader or readers successfully read the tag attached to the store-item being searched for. In addition, there could be instructions for their next 'turn ON' call. The monitoring server 106 can have default settings, in case there are no special instructions waiting for the readers 104.

The inventory module 310 maintains inventory of the store-items currently present in the store. In one embodiment, the inventory module 310 includes a database having a record of the store-items present in the store. The inventory module 310 always keeps the database updated with the help of inventory polls conducted by the readers 104 at regular intervals. In an alternate embodiment, the inventory module 310 maintains a manual database of the store-items. Whenever a store-item is sold or a new item is added in the store, the inventory module 310 receives information pertaining to the sold store-item or the newly added item, and accordingly the inventory module 310 updates its database. In such embodiment, during an inventory poll in the store, the reader manager 308 provides the information obtained from the readers 104 to the inventory module 310. The inventory module 310 compares the information, with the record maintained in its database, and thereby verifies the store-items present in the store.

In one embodiment, the inventory poll is repeated for a pre-determined number of times. This is done to ensure that the readers 104 read each and every tag 102, as customers shuffle the store-items during the day and it may not be possible to read all the tags 102 in one go. There can be several other reasons because of which all the tags 102 may not be read, such as multi-path fading, shadowing of tags by other tags or some metal objects, and the like. Therefore, it is preferable to conduct multiple inventory polls at a time or repeat inventory polls as often as required. The inventory module 310 employs intelligent algorithms, known in the art, to combine the results of the repeated inventory polls to obtain accurate information of the store-items present in the store.

The inventory module 310 provides the accurate information about the inventory to the inventory module 310 and the reader manager 308. The reader manager 308 prepares a report including the results of inventory polls, details of the store-items, location of store-items, and the like. The report may also include power status or battery status of readers 104. Such a report helps a retailer to identify areas that require attention. The monitoring server 106 displays the report in a user-friendly form through a graphical user interface (GUI). For example, the inventory can be displayed as a map of the storage space or retail floor, with the ability to zoom in to certain areas, and to allow the user to investigate in more detail the store-items located at a specific rack or shelf.

Figure 4:
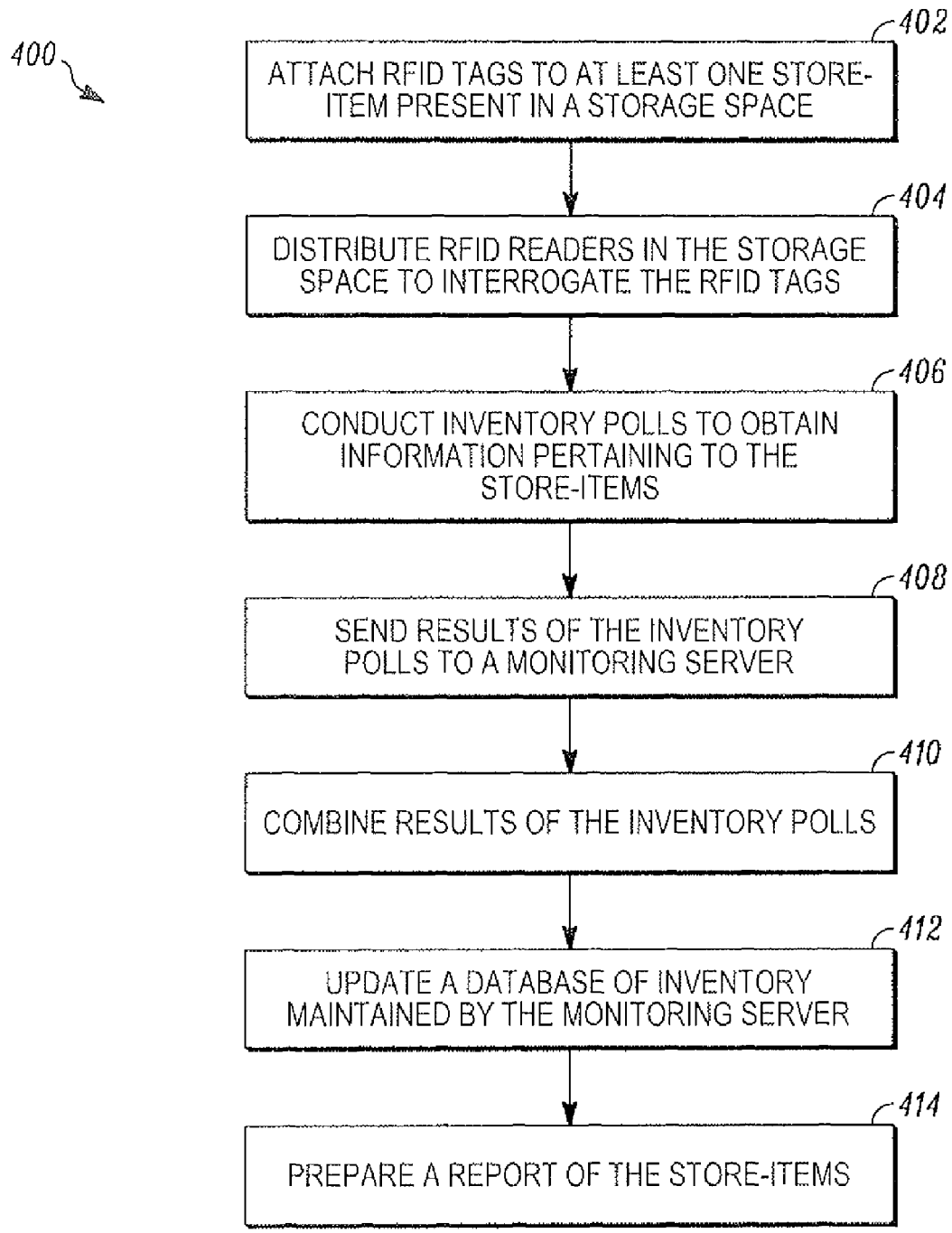
FIG. 4 illustrates a flowchart for tracking inventory present in a store in accordance with some embodiments of the present disclosure.

FIG. 4 illustrates a flowchart showing a method 400 for tracking inventory present in a storage space. The method 400 is applicable for installing an RFID system in places such as retail stores and using the RFID system to keep a track of inventory present in a store. At block 402, RFID tags 102 are attached to one or more store-items present in the storage space. The tags 102 are programmed with details of the respective store-items with which the tags 102 are attached. The details of the store-items can include information such as item description, price, discount, quality, and the like. The tags 102 can be either active devices having their own battery, or passive devices deriving power from the readers 104.

At block 404, the RFID readers 104 are distributed in the storage space to interrogate the tags 102. The readers 104 are distributed throughout the storage space in such a way that each of the tags 102 is in the range of at least one reader. The readers 104 have a limited range and they can only interrogate those tags that are in their coverage range. More readers are required at places where maximum number of store-items is placed, so that the store-items are in the coverage range of more than one reader, and thus ensure scanning of all the tags 102.

At block 406, the readers 104 conduct inventory polls to obtain information about the store-items. In one embodiment, the readers 104 scan within their range to detect tags present in their coverage area. The readers 104 interrogate the tags 102 to obtain the requisite information about the store-items included in the tags 102. Readers 104 interrogate the tags 102 repeatedly up to a pre-determined number of times to ensure that each and every tag is read. The tags 102 can also serve as beacon tags with location information known to the readers 104 or to the monitoring server 106.

At block 408, the RFID readers 104 send the obtained information to the monitoring server 106. In one embodiment, the readers 104 send the information obtained from the tags 102 to the monitoring server 106 wirelessly. Along with the information about the store-items, the readers 104 can also send other information such as their battery power-status, functioning status of the tags 102, and the like to the monitoring server 106.

At block 410, results of all the inventory polls are combined. In one embodiment, the monitoring server 106 employs intelligent algorithms to combine the results of the inventory polls, and thus obtain accurate information of the store-items present in the store. Thereafter, the monitoring server 106 updates its database with the accurate information of the store-items, as indicated at block 412.

At block 414, the monitoring server 106 prepares a report of the store-items. In one embodiment, the monitoring server 106 prepares the report including the result of inventory polling, details of the store-items, inventory map, location of store-items, and the like. The report may also include battery-status of readers 104. Such a report helps a retailer to identify areas that require attention.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Further, it should be observed that the embodiments reside primarily in combinations of method steps and apparatus components related to a real-time automatic RFID inventory control system. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions for the real-time automatic RFID inventory control system described herein. The non-processor circuits may include, but are not limited to, a radio receiver, a radio transmitter, signal drivers, clock circuits, power source circuits, and user input devices. As such, these functions may be interpreted as steps the real-time automatic RFID inventory control system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

All of the embodiments described in this Detailed Description are exemplary embodiments provided to enable persons skilled in the art to make or use the disclosure and not to limit the scope of the disclosure that is defined by the claims.

We claim:

1. A system for tracking items present in a storage space, the system comprising:
   a plurality of radio frequency identification (RFID) readers distributed within the storage space, wherein at least one item, having an RFID tag attached, is within an interrogation range of at least one of the plurality of RFID readers; and
   a monitoring server operative to communicate wirelessly with the plurality of RFID readers,
   wherein the plurality of RFID readers conduct inventory polls pertaining to items present within the storage space by interrogating RFID tags attached to items in the storage space, and send to the monitoring server the results obtained from each inventory poll, and wherein the monitoring server combines the results from each inventory poll to determine which items are present in the storage space, and based on combining the results from each inventory poll, updating a database with the items that are present in the storage space.

2. The system of claim 1, wherein the plurality of RFID readers are battery-powered.

3. The system of claim 2, wherein the plurality of RFID readers are operative to be trickle charged with lighting available in the storage space.

4. The system of claim 2, wherein the monitoring server sets an alert on receiving a power status, indicating low battery power, from at least one of the wireless RFID readers.

5. The system of claim 2, wherein the plurality of RFID readers are operative at low duty cycle.

6. The system of claim 2, wherein each of the plurality of RFID readers sends to the monitoring server a status update of their battery power level.

7. The system of claim 1, wherein the plurality of RFID readers are AC-powered.

8. The system of claim 1, further comprising one or more RFID beacon tags with known location information.

9. The system of claim 1, wherein at least one of the wireless RFID readers is a portable handheld device.

10. system of claim 1 wherein at least one of the plurality of RFID readers comprises at least one of a dual-polarized antenna, a circularly polarized antenna, and an Omni-directional antenna.

11. The system of claim 1, wherein each of the plurality of RFID readers turns ON after pre-specified time intervals to conduct an inventory poll.

12. The system of claim 1, wherein the monitoring server instructs the plurality of RFID the readers to search for a specific item present in the storage space.

13. The system of claim 1, wherein the results obtained from a first inventory poll are different from the results obtained from a second inventory poll.

14. The system of claim 13, wherein the results obtained from a first inventory poll are different from the results obtained from a second inventory poll due to customers shuffling the items in the storage space, thereby changing the multi-path fading, shadowing of RFID tags by other RFID tags, or shadowing of RFID tags by a metal object.

15. The system of claim 1, wherein the monitoring server displays the items that are present in the storage space in a user-friendly form through a graphical user interface.

16. The system of claim 15, wherein the user-friendly form is a map of the storage space.

17. The system of claim 1, wherein the monitoring server instructs the plurality of RFID readers to conduct the inventory polls.

18. The system of claim 1, wherein the monitoring server instructs the plurality of RFID readers to search for a specific item present in the storage space.

19. The system of claim 1, further comprising one of more RFID beacon tags with known location information that is used to determine a location of at least one of the plurality of RFID readers.

20. The system of claim 19, wherein the monitoring server identifies the location of at least one item present in the storage space and displays the location of the at least one item on a map of the storage space.

21. The system of claim 1, further comprising one of more RFID beacon tags with known location information that is used to determine a coverage area of at least one of the plurality of RFID readers.

22. The system of claim 21, wherein the monitoring server identifies the location of at least one item present in the storage space and displays the location of the at least one item on a map of the storage space.

* * * * *

UNITED STATES PATENT AND TRADEMARK OFFICE
CERTIFICATE OF CORRECTION

| | | |
|---|---|---|
| PATENT NO. | : 8,077,041 B2 | Page 1 of 1 |
| APPLICATION NO. | : 12/342499 | |
| DATED | : December 13, 2011 | |
| INVENTOR(S) | : Stern et al. | |

It is certified that error appears in the above-identified patent and that said Letters Patent is hereby corrected as shown below:

In Column 3, Line 63, delete "servo" and insert -- server --, therefor.

In Column 9, Line 28, in Claim 10, delete "system of claim 1" and insert -- The system of claim 1, --, therefor.

Signed and Sealed this
Eighteenth Day of December, 2012

David J. Kappos
*Director of the United States Patent and Trademark Office*